G. I. LEONARD.
AIR PUMP FOR EITHER VACUUM OR PRESSURE.
APPLICATION FILED APR. 16, 1914.

1,188,286.

Patented June 20, 1916.

WITNESSES.
William B. Davies.
A. F. Steele

INVENTOR
George I. Leonard

UNITED STATES PATENT OFFICE.

GEORGE I. LEONARD, OF LOS ANGELES, CALIFORNIA, ASSIGNOR TO LEONARD ROTARY PUMP CORPORATION, OF LOS ANGELES, CALIFORNIA, A CORPORATION OF CALIFORNIA.

AIR-PUMP FOR EITHER VACUUM OR PRESSURE.

1,188,286.  Specification of Letters Patent.  Patented June 20, 1916.

Application filed April 16, 1914. Serial No. 832,366.

*To all whom it may concern:*

Be it known that I, GEORGE I. LEONARD, a citizen of the United States, residing at Los Angeles, county of Los Angeles, and State of California, have invented a new and useful Air-Pump for Either Vacuum or Pressure, of which the following is a specification.

This pump constitutes an improvement on a pump for which patent was granted me July 22nd, 1913, Number 1068251.

In carrying out my invention I employ a pair of gears meshing closely together and fitting into a case which entirely surrounds the face of the gears with the exception of a small space on one side between the gears which constitutes the intake; the exhaust parts of the pump are located in the side casing on the opposite side of the line of contact of the gears just above the line joining their centers and the pump employs a liquid seal between the gears and case, the preferred form being with gears and case submerged in this liquid seal and the entire works placed within a cylinder or casing which acts as a container and pressure chamber, though other mountings may be made without interfering with the principle involved in the pump; further the form of gear used is a spiral gear of the herringbone type or a straight toothed or spur gear may also be used.

Figure 2:
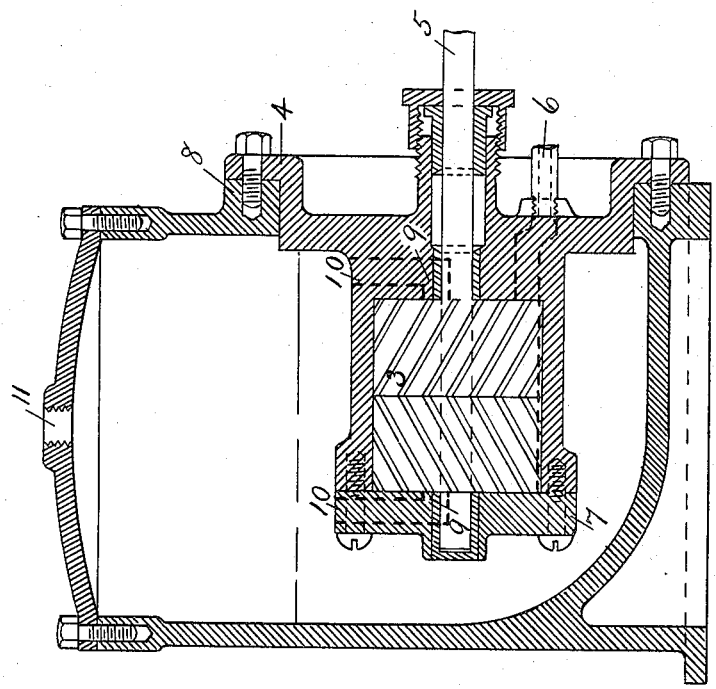
Figure 1:
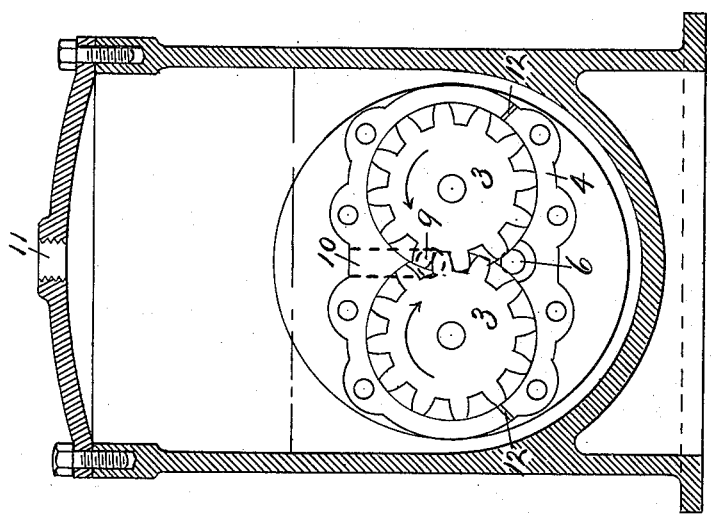

Referring to the drawings Figure 1 is a cross section of the cylinder showing the pump with end plate and bearing removed. Fig. 2 is a cross section of cylinder showing a longitudinal section of pump case with gear in place.

No. 3 are the gears.
4 is the gear case.
5 is a shaft carrying one of the gears.
6 is the intake.
No. 7 is the end plate.
8 is the flanged opening to receive the pump.
9 are the exhaust openings in the end plates.
10 are the passages communicating with exhaust port and outer casing.
11 is an opening in top of outer case for air pipe connection to any external work.
12 orifices to admit sealing liquid.

In operation, as the gears rotate in the direction shown by the arrow, air is taken in at the intake port in the vacant spaces between the teeth and carried around to the contact line between the gears and is thus gradually compressed as the gear teeth commence to mesh until the exhaust port is reached which lies very close to the line of centers of the two gears and located one on each side casing, where it is exhausted into the outer chamber surrounding the pump; then it will be noticed that this completely closing over of the faces of the gears opposite the intake, takes off nearly all of the pressure from the bearings with the exception of the pressure in those teeth in which compression is taking place.

Referring to my application Serial Number 764,259, the teeth are so arranged that in rotation the least point of contact is the vertex formed at the intersection of the teeth and the gear casing is left open at the top to permit the escape of air, while in the present case, the last point of contact is the outer portion of the tooth next the side casing at the point of discharge. A little sealing liquid may be admitted to the gears at any point from the intake to part way around the gear by small orifices bored through the gear case and communicating with the supply of sealing liquid in the outer case.

What I claim is—

1. A rotary geared liquid sealed air pump, comprising a pair of rotatively mounted intermeshing gears working within a closely fitting case having an intake port on one side of the line of their centers, exhaust ports in the side casing on the opposite side of the line of their centers, the gear teeth being obliquely disposed with their last points of contact next the side casing, the faces of the gears entirely inclosed except at the point of intake.

2. A rotary geared liquid sealed air pump comprising a pair of rotatively mounted intermeshing gears working within a closely fitting case, having an intake port on one side of the line of their centers, exhaust ports in the side casing on the opposite side of the line of their centers, the faces of the gears entirely inclosed except at the point of intake.

3. A rotary geared liquid sealed air pump, comprising a pair of rotatively mounted intermeshing gears working within a closely fitting case having an intake port on one side of the line of their centers, exhaust ports in the side casing on the opposite side of the line of their centers, the gear teeth being obliquely disposed with their last points of contact next the side casing, the faces of the gears entirely inclosed except at the point of intake, orifices in the case near the intake port to admit sealing liquid.

4. A rotary geared liquid sealed air pump comprising a pair of rotatively mounted intermeshing gears working within a closely fitting case, having an intake port on one side of the line of their centers, exhaust ports in the side casing on the opposite side of the line of their centers, the faces of the gears entirely inclosed except at the point of intake, orifices in the case near the intake port to admit sealing liquid.

5. A rotary geared liquid sealed air pump consisting of two or more intermeshing gears rotatively mounted within a closely fitting casing, having intake port or ports on one side of the line of their centers and exhaust ports in the side casing on the opposite side of the line of their centers, the casing entirely inclosing the faces of the gears except at their intake ports, orifices in the gear case between the intake and exhaust ports to admit sealing liquid and the entire pump submerged in a sealing liquid within an outer casing substantially as described.

GEORGE I. LEONARD.

Witnesses:
 DESSA WILLIAMS,
 E. M. HARWOOD.